US008597154B2

(12) United States Patent
Polacco et al.

(10) Patent No.: US 8,597,154 B2
(45) Date of Patent: Dec. 3, 2013

(54) GEARING

(75) Inventors: Alessandro Polacco, Pisa (IT);
Giovanni Oddone, Predosa (IT); Marco Facchini, Carmagnola (IT); Ivan Borra, Savigliano (IT)

(73) Assignee: Avio, S.p.A., Turin (IT)

( * ) Notice: Subject to any disclaimer, the term of this patent is extended or adjusted under 35 U.S.C. 154(b) by 305 days.

(21) Appl. No.: 12/974,211

(22) Filed: Dec. 21, 2010

(65) Prior Publication Data
US 2011/0190094 A1  Aug. 4, 2011

(51) Int. Cl.
*F16H 57/08* (2006.01)
(52) U.S. Cl.
USPC .......................................................... 475/331
(58) Field of Classification Search
USPC .......................................................... 475/331
See application file for complete search history.

(56) References Cited

U.S. PATENT DOCUMENTS

| | | | |
|---|---|---|---|
| 4,391,163 A | 7/1983 | Benthake | |
| 6,409,414 B1* | 6/2002 | Altamura et al. | 403/284 |
| 7,011,598 B2* | 3/2006 | Flamang et al. | 475/331 |
| 7,335,128 B2* | 2/2008 | Flamang et al. | 475/331 |
| 7,771,308 B2* | 8/2010 | Willie | 475/347 |
| 7,806,799 B2* | 10/2010 | Smook et al. | 475/344 |
| 8,016,716 B2* | 9/2011 | de Ugarte et al. | 475/331 |
| 8,246,505 B2* | 8/2012 | Saenz De Ugarte et al. | 475/348 |
| 2008/0026902 A1* | 1/2008 | Willie | 475/331 |
| 2008/0194378 A1* | 8/2008 | Fox | 475/347 |

FOREIGN PATENT DOCUMENTS

| | | |
|---|---|---|
| EP | 2072858 | 6/2009 |
| EP | 2072863 | 6/2009 |
| WO | WO 2004/067998 | 8/2004 |
| WO | WO 2005/050058 | 6/2005 |
| WO | WO 2006/000214 | 1/2006 |

OTHER PUBLICATIONS

Italian Search Report mailed May 20, 2010 in Italian Appln. No. TO20091025.

* cited by examiner

*Primary Examiner* — Tisha Lewis
(74) *Attorney, Agent, or Firm* — Davidson Berquist Jackson & Gowdey, LLP

(57) ABSTRACT

Epicyclical gearing comprising a first and a second gear wheel turning around respective mutually parallel axes, each one comprising a respective first and a respective second crown wheel that are adjacent to each other; the gearing also comprising at least one third and at least one fourth gear wheel that are separate and mutually independent, a support body for the third and fourth gear wheels, the support body having hinge pins formed therewith as a one piece structure, the hinge pins providing a mount for the third and fourth gear wheels on the support body in a rotational manner around a third and, respectively, a fourth hinge axis parallel to the axes, the third gear wheel meshing with the respective first crown wheels and the respective fourth gear wheel meshing with the respective second crown wheels.

16 Claims, 2 Drawing Sheets

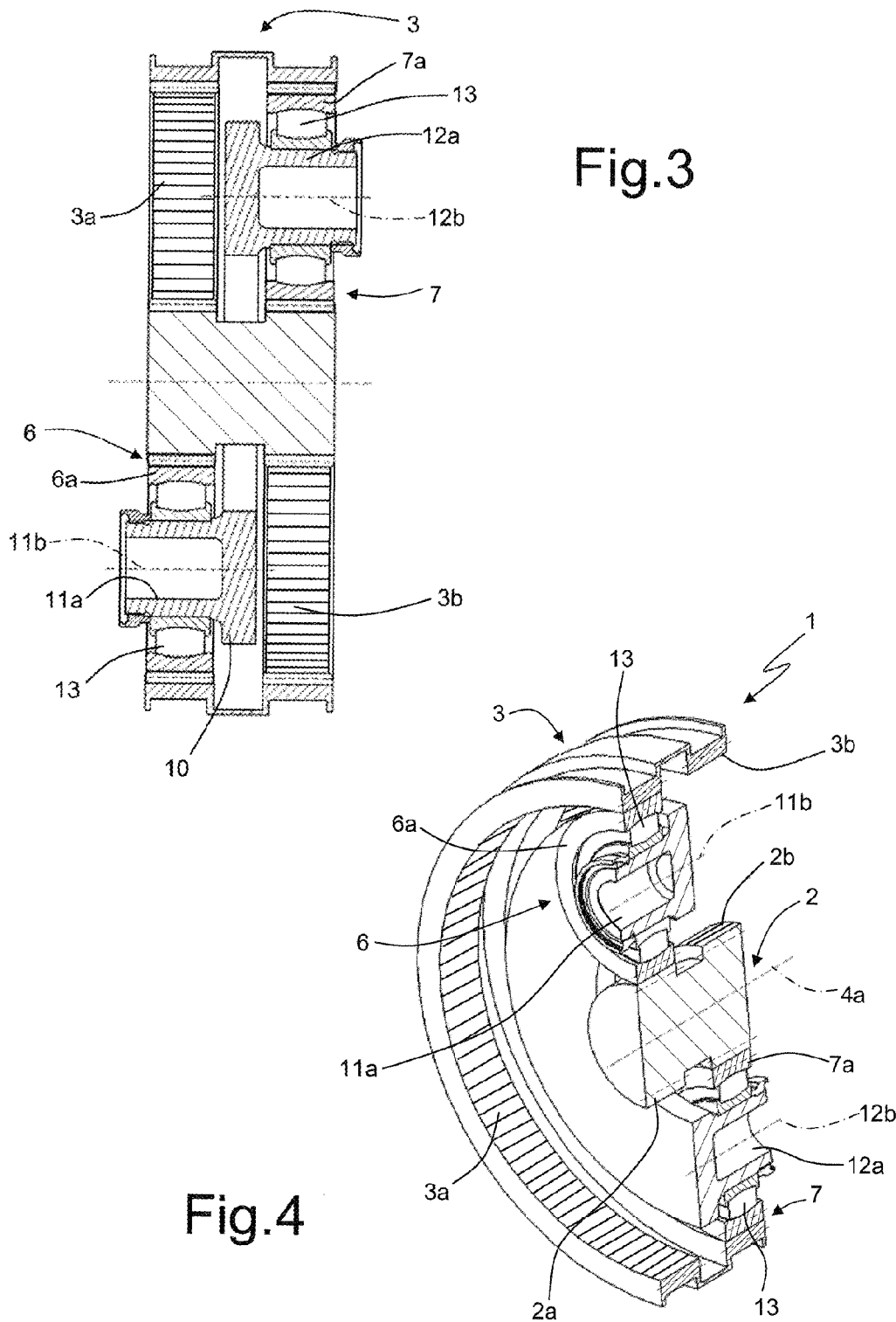

GEARING

The present invention relates to a gearing and, in particular, to a epicyclical gearing, to which the following disclosure will explicitly refer without because of this loosing in generality.

BACKGROUND OF THE INVENTION

In the field of motion transmission by means of gear wheels there is known to use epicyclical gearings comprising a sun gear, a crown, a plurality of planet gears meshing with the sun gear and the crown and a planet gear holder, to which the planet gears are coupled by means of respective hinge pins.

Different configurations are known, in which one or more of the above said components are connected to one or more motors and to one or more users.

With the available envelope being the same for the installation of the gearing, the selection of the kind of architecture depends mainly on the load to be transmitted. As a matter of fact, as the load increases, not only do the stresses increase on the toothing of the wheels, which therefore require a dedicated surface treatment and finishing, but also the stresses on the support structures of the gear wheels such as, in particular, the hinge pins and the planet gear holders. Failures or deformations of the hinge pins or the planet gear holders generate stress concentrations and a subsequent local unpredictable wear of the various details moving one with respect to the other.

In the attempt to overcome such drawbacks, nowadays there are used wheels with a two helicoidal toothing mounted on plain bearings. If on one side such an architecture solves at least some of the above said problems, on the other side, it results poorly satisfactory in that it makes the assembly process of the gearing and the installation of the gearing on the dedicated machines particularly complicated. Besides, the two helicoidal wheel architecture requires an accurate calibration of all of the rigidities of the hinge pins of the planet gears and of the planet gear holder itself to avoid that, in a loaded condition, the toothing of the wheels is arranged in a meshing position other than the intended one and therefore operates in an excessive interference or play condition.

SUMMARY OF THE INVENTION

It is the object of the present invention to provide a gearing, the features of which allow to simply and cost-effectively solve the problems presented above.

According to the present invention there is provided a gearing comprising a first and a second gear wheel turning around respective mutually parallel axes, each comprising a respective first and a respective second crown wheel that are adjacent to each other, the gearing also comprising at least one third and at least one fourth gear wheel that are separate and mutually independent, a support body for said third and fourth gear wheels, hinge pins for mounting said third and fourth gear wheels on said support body in a rotational manner around a third and, respectively, a fourth hinge axis parallel to said axes, said third gear wheel meshing with said respective first crown wheels and said respective fourth gear wheel meshing with said respective second crown wheels.

Preferably, in the above said gearing said third and fourth hinge axes mutually coincide or are transversally set apart from each another and, conveniently, said third and fourth wheels are arranged on axially opposite sides of said support body.

BRIEF DESCRIPTION OF THE DRAWINGS

The invention will now be described with reference to the accompanying drawings which illustrate a non-limitative embodiment thereof, in which:

FIG. 3 is a figure similar to FIG. 1 and shows a section view of a variant of a detail of FIG. 1; and FIG. 4 shows a partial perspective view with parts removed for clarity of the gearing of FIG. 3.

DETAILED DESCRIPTION OF THE INVENTION

Figure 1:
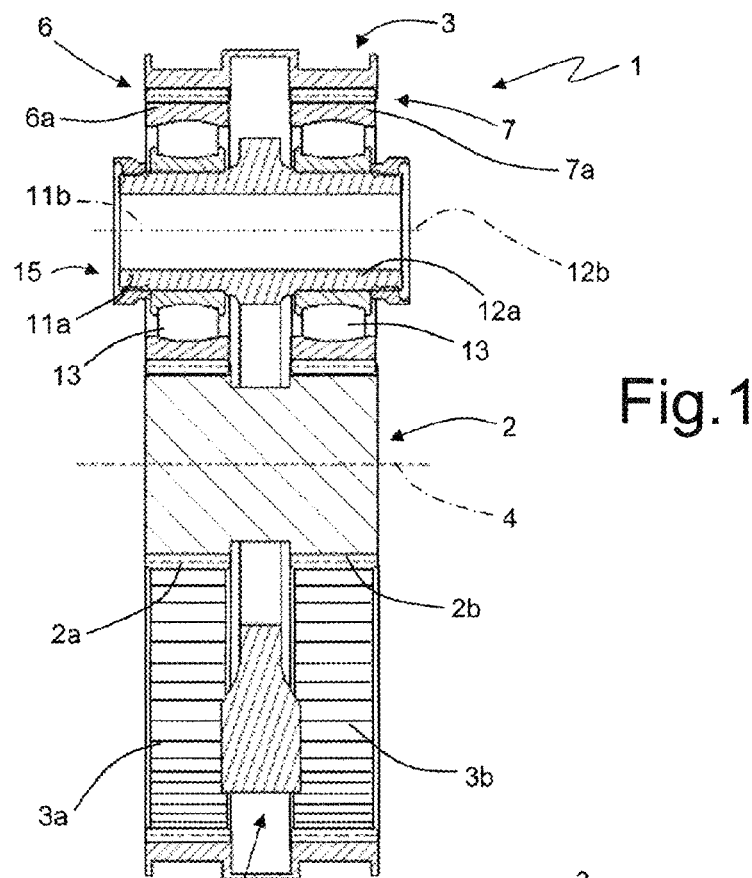
FIG. 1 shows a section view of a preferred embodiment of a gearing according to the present invention.
Figure 2:
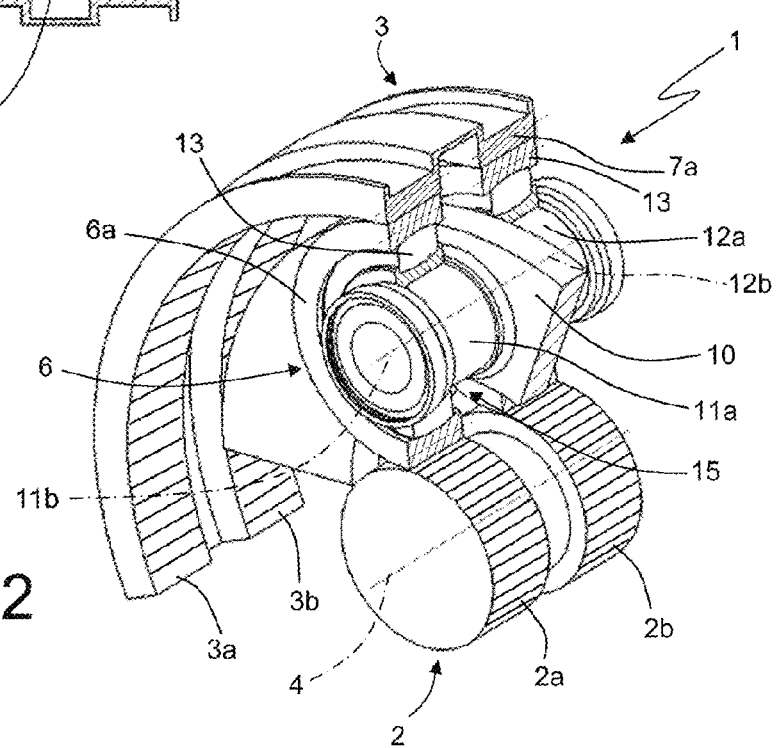
FIG. 2 shows a partial perspective view with parts removed for clarity of the gearing of FIG. 1.

In FIGS. 1 and 2, numeral 1 indicates, as a whole, a gearing, in particular a epicyclical gearing comprising a sun gear 2 and a crown 3 turning around a common axis 4. Sun gear 2 comprises two outer straight toothed crowns 2a, 2b adjacent to one another and crown 3 comprises two inner straight toothed crowns indicated by 3a and 3b. In the particular example shown, sun gear and crown 3 are integral. Alternatively, at least crown 3 consists of two annular portions, each bearing a respective crown wheel 3a, 3b and are stably connected to one another.

Again with reference to FIGS. 1 and 2, gearing 1 further comprises two sets 6 and 7 of planet gears 6a and 7a which are arranged mutually in parallel coaxially to axis 4 and mutually independent. Planet gears 6a of set 6 mesh with crown wheels 2a and 3a, while planet gears 7a of set 7 mesh with crown wheels 2b and 3b. Like sun gear 2 and crown 3, planet gears 6a and 7a are also straight toothed. Planet gears 6a and 7a are borne by a planet gear holder 10, which, in the particular example disclosed, consists of a plate body and extends between two sets 6 and 7 of planet gears. Planet gears 6a, 7a are coupled to planet gear holder 10 by means of respective hinge pins 11a and 12a, which are integral with planet gear holder 10 itself, protrude from planet gear holder 10 coaxially to respective mutually parallel axes 11b, 12b and to axis 4, and to which respective planet gears 6a and 7a are coupled by means of respective plain bearings 13 and, conveniently, of the self-aligning barrel bearing type.

Again with reference to FIGS. 1 and 2, two sets 6 and 7 of planet gears 6a and 7a are arranged symmetrically with respect to planet gear holder 10 i.e. on axially opposite sides of planet gear holder 10, and therefore pins 11a and 12a form pairs 15 of pins coaxial to one another and extending in opposite positions (FIG. 1).

Alternatively, according to what has been shown in FIGS. 3 and 4, sets 6 and 7 are angularly rotated with respect to one another around axis 4, whereby each of pins 11a, 12a extends along a respective axis which is angularly rotated with respect to the axes of the other planet gears by a determined angle.

Independently of the relative angular position of sets 6, 7 of the planet gears, in disclosed gearing 1, the inputted torque is divided following two distinct torque paths defined partly by two sets 6, 7 of planet gears. In disclosed gearing 1, two sets 6, 7 of planet gears are mutually independent. This greatly improves the partitioning of the inputted torque, decreasing the load on the single component, in particular on the toothings, and inhibiting the formation of local loads or concentrations of stresses between the toothings meshing with one another or on different supports. Local loads and stress concentrations are in particular avoided by the presence of pins protruding from a plate-like planet gear holder body and by the fact that planet gears 6a, 7a are coupled to the pins by means of spherical supports, such as for example rolling-contact self-aligning bearings. When they are designed, the spherical supports, with respect to the traditional plain bearings, aid and simplify the sizing especially as regards the rigidity of pins 11a, 12a as they are able to compensate the possible misalignments under load. Furthermore, in case rolling-contact self-aligning bearings are used again in place of plain bearings, these result much less sensitive to the action of external contaminants. This allows to simplify the feeding circuit for lubricating fluids of the bearings themselves.

Instead, as regards the appearance, it is clear that, with respect to the known solutions, the presence of straight toothed wheels considerably aids the assembly of gearing 1, but also aids the assembly of the gearing itself on the machines for which the gearing is intended.

From the above it is apparent that changes and variations may be made to the disclosed gearing 1 without because of this departing from the scope of protection defined by the independent claim.

In particular, by way of example, the relative arrangement of the different gear wheels of the gearing could be different. Specifically, it is clear that the gearing could be other than an epicyclical gearing. It could comprise two external wheels having two respective straight toothed crown wheels turning, for example, around axes which do not mutually coincide and could comprise, for each crown wheel, one or more intermediate wheels meshing with the above cited external wheels borne by respective support structures.

Finally, support pins 11a and 12a of planet gears 6a and 7a could be made integral with planet gear holder 10 and the planet gears themselves could be coupled to respective pins by means of rolling bearings other than those indicated by way of example and comprising, for example, several crowns of rolling elements.

Finally, planet gear holder 10 could also have a structure other than that indicated by way of example.

The invention claimed is:

1. Epicyclical gearing comprising a sun gear comprising two outer straight toothed crowns positioned adjacent one another a first and a second gear wheel turning around respective mutually parallel axes, each comprising a respective first and a respective second crown wheel that are adjacent to each other, the gearing also comprising at least one third and at least one fourth gear wheel that are separate and mutually independent, a support body for said third and fourth gear wheels, hinge pins for mounting said third and fourth gear wheels on said support body in a rotational manner around a third and, respectively, with the support body and said hinge pins being formed as an integral, one piece structure, a fourth hinge axis parallel to said axes, said third gear wheel meshing with said respective first crown wheels and with a respective one of the two outer straight toothed crowns of said sun gear, and said respective fourth gear wheel meshing with said respective second crown wheels and with the other of the two outer straight toothed crowns of said sun gear.

2. The gearing according to claim 1, wherein said third and fourth hinge axes are mutually coincident.

3. The gearing according to claim 1, wherein said third and fourth hinge axes are transversally set apart from each other.

4. The gearing according to claim 1, wherein said third and fourth gear wheels are arranged on axially opposite sides of said support body.

5. The gearing according to claim 1, wherein said hinge pins of said third and fourth gear wheels protrude from said support body.

6. The gearing according to claim 1, wherein said third and fourth gear wheels are coupled to said respective hinge pins by means of rolling-contact or self-aligning bearings.

7. The gearing according to claim 1, further comprising a first set of said third gear wheels and a second set of said fourth gear wheels, said first and second sets being mutually coaxial and independent.

8. The gearing according to claim 7, wherein said first set of wheels is angularly staggered with respect to said second set of wheels.

9. The gearing according to claim 7, wherein each third wheel of said first set of wheels is coaxially aligned with a corresponding fourth wheel of said second set of wheels.

10. The gearing according to claim 8, wherein said first and second set of gear wheels are arranged on axially opposite sides of a common annular support body.

11. The gearing according to claim 10, wherein said annular body is in the form of a plate.

12. The gearing according to claim 1, wherein said gear wheels are straight toothed.

13. The gearing according to claim 1, wherein said support body comprises a plate positioned between said at least one third gear wheel and said at least one fourth gear wheel and around said sun gear.

14. Epicyclical gearing comprising a first and a second gear wheel turning around respective mutually parallel axes, each comprising a respective first and a respective second crown wheel that are adjacent to each other, the gearing also comprising at least one third and at least one fourth gear wheel that are separate and mutually independent, a support body for said third and fourth gear wheels, hinge pins for mounting said third and fourth gear wheels on said support body in a rotational manner around a third and, respectively, a fourth hinge axis parallel to said axes, said third gear wheel meshing with said respective first crown wheels and said respective fourth gear wheel meshing with said respective second crown wheels, and wherein said third and fourth hinge axes are transversally set apart from each other.

15. Epicyclical gearing comprising a first and a second gear wheel turning around respective mutually parallel axes, each comprising a respective first and a respective second crown wheel that are adjacent to each other, the gearing also comprising at least one third and at least one fourth gear wheel that are separate and mutually independent, a support body for said third and fourth gear wheels, hinge pins for mounting said third and fourth gear wheels on said support body in a rotational manner around a third and, respectively, a fourth hinge axis parallel to said axes, said third gear wheel meshing with said respective first crown wheels and said respective fourth gear wheel meshing with said respective second crown wheels, further comprising a first set of said third gear wheels and a second set of said fourth gear wheels, said first and second sets being mutually coaxial and independent, and wherein said first set of wheels is angularly staggered with respect to said second set of wheels.

16. The gearing according to claim 15, wherein said first and second set of gear wheels are arranged on axially opposite sides of a common annular support body.

* * * * *

UNITED STATES PATENT AND TRADEMARK OFFICE
CERTIFICATE OF CORRECTION

| | | |
|---|---|---|
| PATENT NO. | : 8,597,154 B2 | Page 1 of 1 |
| APPLICATION NO. | : 12/974211 | |
| DATED | : December 3, 2013 | |
| INVENTOR(S) | : Alessandro Polacco et al. | |

It is certified that error appears in the above-identified patent and that said Letters Patent is hereby corrected as shown below:

Title Page

On page 1, insert the following omitted Foreign Application Priority as item (30).

-- December 22, 2009 (IT) ........................ TO2009A001025 --

Signed and Sealed this
Fourteenth Day of July, 2015

Michelle K. Lee
*Director of the United States Patent and Trademark Office*